United States Patent Office 3,462,274
Patented Aug. 19, 1969

3,462,274

LIGHT-SENSITIVE LAYERS FOR GRAPHIC ARTS PURPOSES USING POLYVINYL BENZYL N-(4-VINYLPYRIDINIUM) SALTS

Helmut Maeder, Leverkusen, and Bernhard Seidel, Cologne-Mulheim, Germany, assignors to Agfa-Gevaert Aktiengesellschaft, Leverkusen, Germany, a corporation of Germany No Drawing. Filed Apr. 6, 1966, Ser. No. 540,511
Claims priority, application Germany, Apr. 8, 1965
A 48,874
Int. Cl. G03c *1/70, 5/00*
U.S. Cl. 96—115 5 Claims

ABSTRACT OF THE DISCLOSURE

Light-sensitive material having, on a support, a layer of a polymer susceptible to cross linking whereby it becomes insolubilized when exposed to light, and a photosensitizer therefor, the polymer containing in its structure at least 10 mol percent of a polymerizable vinylbenzyl-N-(4-vinyl)-pyridine quaternary salt wherein the 4-vinyl group has an aryl, thienyl or furyl group in β-position, or a vinylene homolog of such salt.

It is known to employ different polymers as light-sensitive systems. Exposed as a thin layer on a suitable support through an original they are crosslinked imagewise, i.e., hardened locally so that a following development with a solvent or solvent mixture for the polymer redissolves the not-crosslinked layer areas, whereas crosslinked areas have become insoluble by the exposure. Such systems with inherent layer sensitivity which are operative without additional inductors of photocrosslinking such as dichromates or diazides, which are added to water-soluble polymers or natural products such as polyvinyl alcohol, gelatin, albumen, and also to organophilic materials such as cyclized caoutchouc or butadiene-styrene copolymers, are known, Among them are cinnamic acid esters of polyvinyl alcohol, including those with a urethane linkage, also chalcones linked to polymers in the same manner.

It is also known to prepare polymers containing azide groups which possess inherent sensitivity to light and UV radiation. Such compounds and copying layers made with them have been described, for example, in German Patents 1,053,782, 1,079,949 and 1,114,704. The latter includes the use of diazo compounds.

A disadvantage of the systems named is the low resistance of the crosslinked layers against strong acids which are used to etch the processed plates. Other drawbacks are frequently the low sensitivity of the layers, and the processing of the light-sensitive materials caused, e.g., by the poor adhesion of the layers to the support.

Some time ago (Makromol. Chem. 73, 203–214; 1963) poly-(2-arylvinyl-N-vinylpyridinium arylsulfonates) were described as new class of photocrosslinkable polymers. The paper cited describes the preparation and photocrosslinking of compounds of the structure

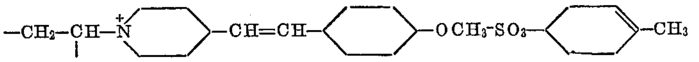

It is technically very desirable that the absorption of this compound extends into the relatively long wavelengths (up to about 500 mμ), because of the positive charge of the N in a conjugated system, and therefore it is far more favorable for light sources emitting in the visible range than, e.g., polyvinylcinnamate. However, the compounds are hygroscopic, and form unsatisfactory films with poor adhesion, so that photocrosslinking did not produce the desired results.

It has now been found that photocrosslinkable layers with excellent properties can be obtained if the light-sensitive polymers consist wholly or in part of polymerized units or salts of vinylbenzyl-N-(4-vinyl)-pyridine whose vinyl group is substituted in β-position with an aromatic ring, or of the vinylene homologs of such units, i.e., units in which the β-substituted 4-vinyl group is replaced by the radicle $>C{=}CH{-}(CH{=}CH)_m{-}$ wherein *m* is an integer, and the terminal carbon atom $>C{=}$ is joined to at least one aromatic ring. Particularly suitable are polymers with units of the following structure:

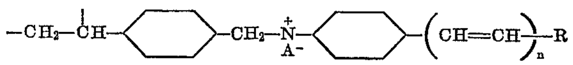

wherein R is an aromatic (aryl or quasiaromatic heterocyclic) residue, e.g., phenyl, naphthyl, thienyl, or furyl. These aromatic rings, as well as the phenylene ring of the benzyl group or the pyridine ring may contain further substituents, especially halogen such as Cl or Br, alkyl with preferably up to 5 carbon atoms, alkoxyl also with preferably up to 5 carbon atoms, $NO_2$, nitrile, phenyl, naphthyl, and the like. The selected substituents must not interfere with the photocrosslinking properties; certain properties, e.g., the solubility, can be influenced favorably by suitable substituents; n represents a whole number between 1 and 5, preferably 1 or 2, especially 1; and $A^-$ represents any anion. The type of anion is not critical, and depends on the method of preparation. Generally it will be a halogen anion such as $Cl^-$, $SO_4^{--}$, tosylate, alkylsulfonate anions or the like.

The polymers of the invention containing the above units preferably have a molecular weight between 1000 and 15,000. Preferred are products containing at least 10 mole percent of units of the above general structure. The polymers may contain any other polymerizable vinyl compounds in polymerized form. Certain properties of the polymers, e.g., the solubility, can thereby be adjusted in a desired manner. Suitable copolymer components are, for example, styrene, ethylene, propylene, butylene; acrylic acid, methacrylic acid, or their derivatives (e.g., esters, amides or nitriles); vinyl esters (e.g., vinyl acetate); vinyl ethers (e.g., vinyl butyl ether); vinyl chloride, or mixtures thereof.

Layers made with the compounds of the invention exhabit good film forming properties, can be prepared simply and in good yield, and have high speeds. Crosslinked layers exhibit a good resistivity against etching chemicals such as nitric acid and are therefore excellently suited for the preparation of etch resists for various purposes. The novel compounds can also be made with other than the mentioned starting polymers, especially copolymers of polystyrene with acrylonitrile, acrylic esters, N-vinylpyrrolidone, or N-vinyl carbazole. Light-sensitive layers of the invention can be sensitized in the conventional manner, particularly by compounds containing ketone or aldehyde functions, e.g., 4,4'-dimethylaminobenzophenone (Michler's ketone) and 4-aminobenzaldehyde.

Suitable as supports for the novel layers are particularly metals such as Zn, Al, Mg, Cu, Fe as well as others which suit the purpose in question. All light sources suitable for such purposes can be used for the crosslinking if they have the proper intensity in the visible and UV regions, e.g. carbon arc lamps, xenon high pressure arcs, Hg vapor lamps, etc. as well as sunlight. Preferred is the use of carbon arcs, xenon lamps, and Hg high pressure lamps.

For better evaluation of the results achieved the layers of the invention can be stained after the crosslinking, e.g. with a solution of crystal violet in chloroform.

Suitable polymers contain units of the following types:

I
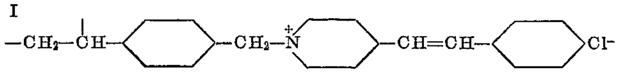

II
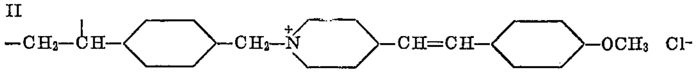

III
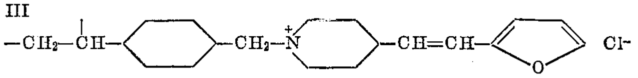

IV
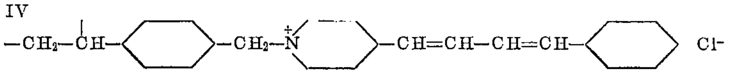

V
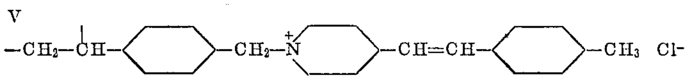

VI
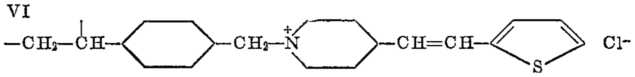

The compounds are prepared by quaternizing poly (vinyl benzyl chloride) with picoline and further condensation with suitable aromatic or quasiaromatic aldehydes, e.g. benzaldehyde, methoxybenzaldehyde, furfurol, cinnamaldehyde, or naphthaldehyde.

The preparation of some compounds is described as follows:

(1) Poly (vinyl benzyl chloride).—A mixture of 2.75 g. stannic chloride and 37 ml. monochlorodimethyl ether are added dropwise with stirring to a mixture of 37 g. polystyrene (mol. wt. 1000–1500) with 37 ml. monochlorodimethyl ether, and the mixture then heated with stirring for 6 hours at 50° C. Purification is achieved by reprecipitating the product with methanol from benzene solution. Yield 40 g.

(2) Quaternization with picoline.—A solution of 18.6 g. 4-picoline in 30 ml. dioxane is added dropwise to a solution of 60 g. poly (vinyl benzyl chloride) in 400 ml. dioxane, and the mixture stirred for 1 hour at room temperature and then 5 hours at 50° C. After evaporation of the dioxane in vacuo, the resulting readily water-soluble quaternary salt is digested again with acetone and dried over $P_2O_5$ in vacuo.

(3) Compound I.—10.5 g. of the above quaternary salt is stirred in the dark with 3–4 times its weight of benzaldehyde and 1.74 ml. piperidine for 140 hours at 45° C. The condensation product is precipitated by adding about 1 liter of acetone, filtered out, and dried over $P_2O_5$.

The other compounds listed in the table can be prepared analogously. The chloromethylation and following quaternization can be applied to copolymers which may be prepared as follows:

A mixture of 45 ml. styrene and 5 ml. ethyl acrylate (or 47.5 ml. styrene and 2.5 ml. acrylonitrile) is added dropwise at 70–80° C. to a solution of 0.6 ml. $SnCl_4$ in 25 ml. benzene, and the mixture stirred for 4 hours at 75° C. The resulting polymers are precipitated by adding methanol. For purification they are dissolved in chloroform and reprecipitated by addition of methanol.

Example 1

48. g. of compound I prepared as described is dissolved at 40° C. in a mixture of 320 ml. chloroform and 80 ml. ethanol. 1.8 g. Michler's ketone in 20 ml. chloroform is added. The mixture is coated onto a well cleaned Zn plate to a layer of about 10μ and dried for about 30 min. at room temperature. Then it is exposed through a line original for 1 minute to a carbon arc lamp (45 v. 15 amp.), at a distance of 30 cm., and developed for 2 min. in the solvent used for the coating. When dried, there remains a sharp-edged relief whose background is clean and free of uncrosslinked layer components, and which adheres well to the support. On etching for 5 minutes in 5% nitric acid, rinsing and drying, a metal relief is obtained which is suitable for use as a printing matrix.

Example 2

The process of Example 1 is repeated, but as support, a plate of a phenol-formaldehyde resin covered with copper foil is used. After exposure and development, a relief is obtained as in Example 1. If layers thicker than that of Example 1 are applied, it is advisable to carry out a second brief development (1 min.) with fresh developer in order to be certain to remove unexposed layer residues.

Example 3

20. g. of the compound of Formula IV are dissolved at 40° C. in 200 ml. chloroform, and a solution of 0.4 g. 4-(dimethylamino)-benzaldehyde in 10 ml. chloroform is added. The resulting solution is coated as in Example 1 and the dried coating exposed in the same manner, but for 30 seconds only. After development in chloroform for 20–30 seconds, sharp-edged reliefs with especially smooth surface are produced. Some drops of 33% nitric acid applied after drying cause no observable change of the layer.

Example 4

The process of Example 3 is repeated, but the 4-(dimethylamino)-benzaldehyde is replaced by 1.0 g. Michler's ketone. After coating, exposure, and development the same result is obtained as in Eaxmple 3.

We claim:

1. Light-sensitive material having a support, and a layer thereon of a polymer susceptible to crosslinking under the influence of light whereby it becomes insoluble, and a photosensitizer therefor, said polymer comprising in its structure at least 10 mol. percent of polymerizable units selected from the group consisting of vinylbenzyl-N-(4-vinyl)pyridine quaternary salts wherein the 4-vinyl group is substituted in β-position by a residue selected from the group consisting of aryl, thienyl and furyl residues, and the vinylene homologs of said salts.

2. Light-sensitive material according to claim 1, wherein said polymerizable units have the following formula:

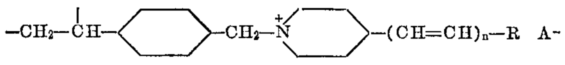

wherein R is selected from the group consisting of aryl, thienyl and furyl residues, A is an anion, and $n$ is a whole number between 1 and 5.

3. Light-sensitive material according to claim 1, wherein said polymerizable units have the following formula:

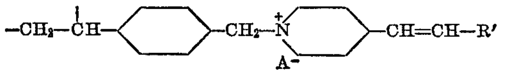

wherein R′ is an aryl radical and $A^-$ is an anion.

4. Light-sensitive material according to claim 1, wherein the polymer susceptible to crosslinking is a copolymer of said polymerizable salt with a polymerizable monomer selected from the group consisting of acrylic esters, methacrylic acid esters, acrylonitrile, N-vinylcarbazole and N-vinylpyrrolidone.

5. Light-sensitive material according to claim 1, wherein said photosensitizer is selected from the group consisting of aldehydes and ketones.

References Cited

UNITED STATES PATENTS

| | | | |
|---|---|---|---|
| 2,811,443 | 10/1957 | Robertson et al. ______ | 96—35.1 |
| 2,811,510 | 10/1957 | Leubner et al. ____ | 96—115 XR |
| 2,908,667 | 10/1959 | Williams _________ | 96—115 XR |

NORMAN G. TORCHIN, Primary Examiner

R. H. SMITH, Assistant Examiner

U.S. Cl. X.R.

96—35.1